(No Model.) 2 Sheets—Sheet 1.

L. BANNISTER.
MEANS FOR COLLECTING WASTE GAS FROM LEAKS AT THE JOINTS OF GAS CONDUITS.

No. 336,199. Patented Feb. 16, 1886.

WITNESSES
Ed. A. Newman.
Al. C. Newman.

INVENTOR
Lemuel Bannister,
By his Attorneys
Baldwin, Hopkins & Peyton.

N. PETERS, Photo-Lithographer, Washington, D. C.

(No Model.) 2 Sheets—Sheet 2.
L. BANNISTER.
MEANS FOR COLLECTING WASTE GAS FROM LEAKS AT THE JOINTS OF GAS CONDUITS.
No. 336,199. Patented Feb. 16, 1886.
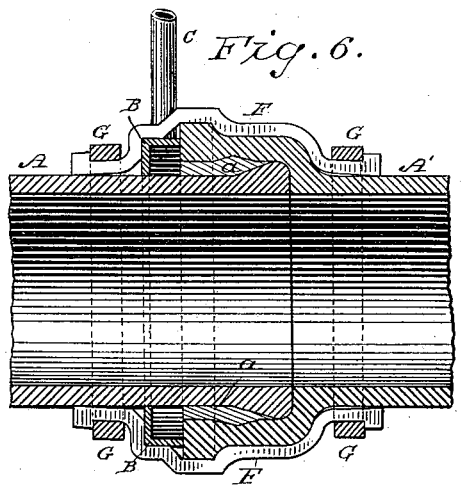
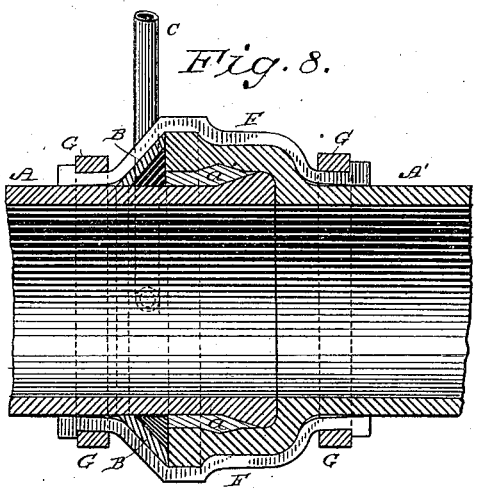
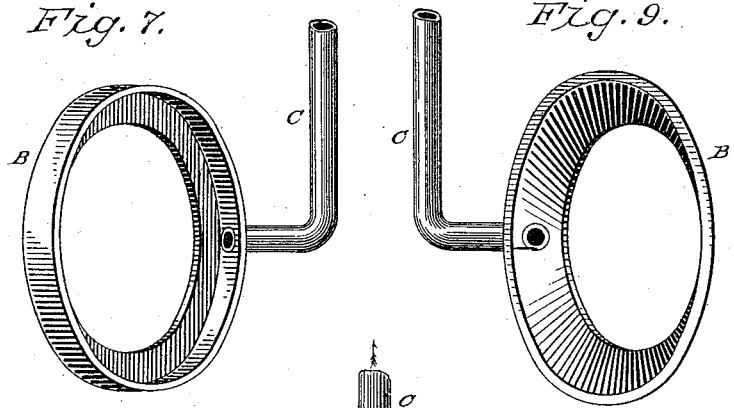
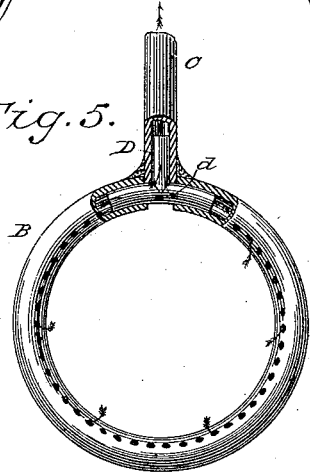
WITNESSES
Ed. A. Newman
Al. C. Newman
INVENTOR
Lemuel Bannister,
By his Attorneys
Baldwin, Hopkins & Peyton

UNITED STATES PATENT OFFICE.

LEMUEL BANNISTER, OF PHILADELPHIA, PENNSYLVANIA.

MEANS FOR COLLECTING WASTE GAS FROM LEAKS AT THE JOINTS OF GAS-CONDUITS.

SPECIFICATION forming part of Letters Patent No. 336,199, dated February 16, 1886

Application filed November 28, 1885. Serial No. 184,161. (No model.)

*To all whom it may concern:*

Be it known that I, LEMUEL BANNISTER, of Philadelphia, county of Philadelphia, State of Pennsylvania, have invented an Improved Means for Collecting Waste Gas from Leaks at the Joints of Gas-Conduits, of which the following is a specification.

My invention is specially designed for use in connection with pipe systems for conveying the natural gas now so extensively used. Such gas is usually under a pressure much higher than that of the ordinary manufactured illuminating-gas, and consequently the leakage through defective joints is very much greater. The gas from such leaks permeates the earth, and is liable to collect in cellars and other underground chambers, where it may, through inadvertence, be exploded.

Various arrangements have heretofore been patented for collecting such escape-gas from the joints of the pipes and conveying it away.

The object of my invention is to provide an arrangement of great simplicity and effectiveness of operation, which may be readily applied to the cast and wrought pipe systems now in general use.

Figure 1:
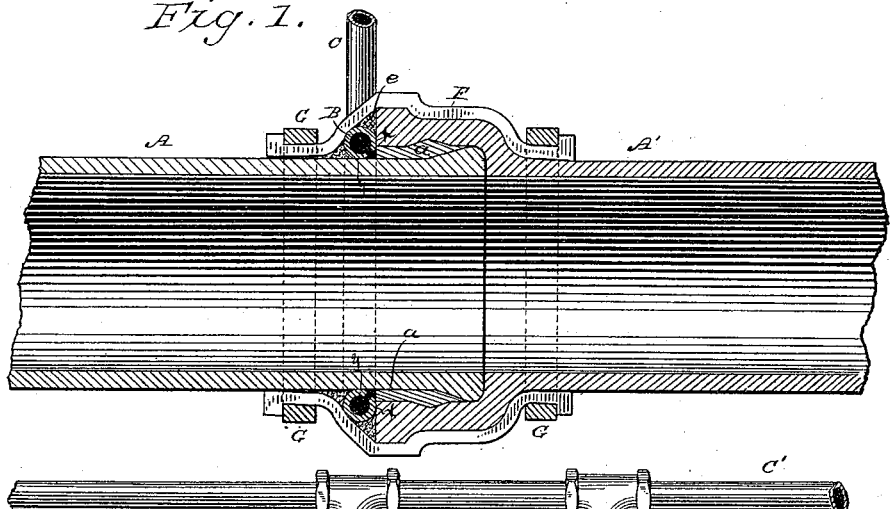
Figure 2:
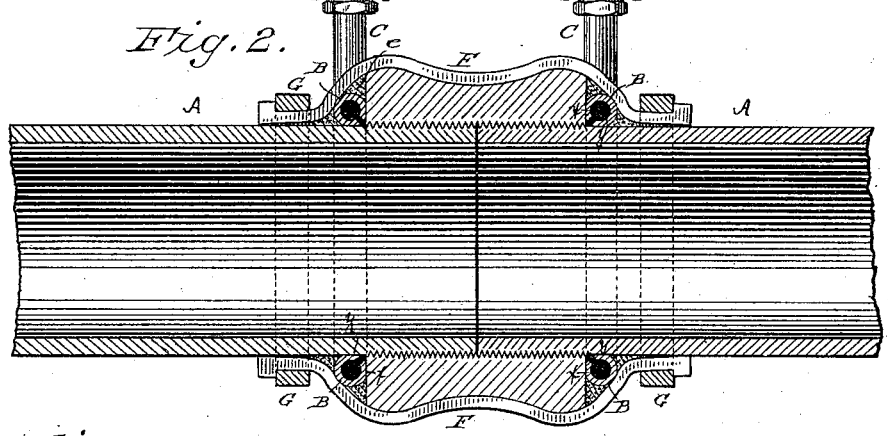
Figure 3:
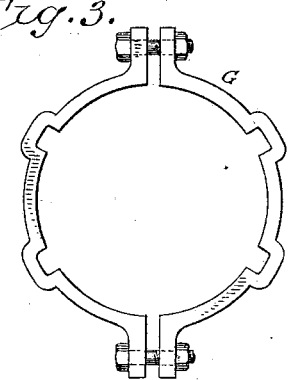
Figure 4:
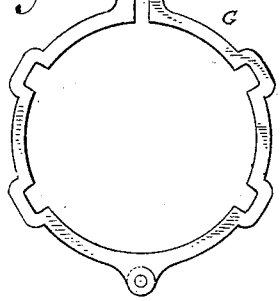

In the accompanying drawings, Figure 1 is a longitudinal section through a cast-iron pipe-joint, showing my invention applied. Fig. 2 is a similar section through a wrought-iron pipe-connection; Figs. 3 and 4, detail views of the clamps which I may employ. Fig. 5 is a detail view showing the pipe which I may employ for collecting waste gas. Figs. 6 and 7 are views indicating a modified structure, and Figs. 8 and 9 are views illustrating still another structure.

The preferred form of my invention is indicated in Figs. 1, 2, and 5, which I will first describe.

In Fig. 1, A is the spigot end of an ordinary section of cast-iron pipe, and A′ the bell end of the adjoining section. These pipes are joined in the ordinary manner, and may be packed by a cement or lead packing, *a*, as usual.

In order now to provide for the collection of any gas that might escape from a defect in the packing or jointing of the pipes—which may be caused by unequal strain due to the irregularity of the bed upon which the piping is laid, or to expansion and contraction, or from other causes—I form a gas-collecting chamber by providing a suitable annular cover or ring, which makes contact with the vertical face of the bell-mouth of one section of pipe and the horizontal face of the spigot end of the other section of pipe. In other words, within the triangular space which would be formed by drawing a line from the upper edge of the bell-mouth of one pipe-section to the side of the adjoining pipe-section I form a gas-receiving chamber. This chamber is preferably formed, as shown in Figs. 1, 2, and 5, by an annular pipe, B, which is preferably of lead or some other soft metal, which is arranged around the pipe-section A, as clearly shown in the drawings. This pipe, when firmly clamped into place, as is presently described, will make contact with the vertical face of the bell-mouth of one pipe-section and the face of the other pipe-section and form an annular chamber, indicated by the triangular black space in the drawings. The pipe B is preferaby flattened at *x* and *y*, where it rests against the pipe-sections A and A′, to afford a closer and more complete joint. The collecting-pipe B is slit or perforated, as shown, on the side forming the wall of the gas-chamber just described. The gas which escapes from the defective joint will pass from the gas-chamber into the collecting-pipe, and may be carried off by a pipe, C, which may be connected with the annular gas-collecting pipe B in a suitable way.

The structure shown in Fig. 5 is a convenient means for joining the pipes. As shown in that figure, I employ a three-way or T-shaped connecting-piece, D, over the arms of which the ends of the annular collecting-ring and of the conveying pipe C are fitted and hermetically joined by any suitable cement or packing, or by an ordinary lead joint. This cement-packing or lead joint need not extend entirely around the collecting-pipe B; but the ends of the pipe in line with the perforations may be left unclosed, and a gas-aperture, *d*, may be formed in the T-shaped connecting-piece E, as shown in Fig. 5.

In order to more completely guard against the possibility of any escape from the gas-chamber formed by the annular collecting-pipe B, the pipe may be packed around with Portland cement or other suitable material, as indicated by e. The collecting-pipe and cement packing are firmly clamped in place and pressed against the pipe-sections by retaining-arms F, which are formed, as shown in Fig. 1, to fit the contour of the bell-mouth of the pipe-section, and are firmly clamped in place by clamp-rings G, which may be made as shown in Figs. 3 and 4. These clamps are provided with internal recesses or notches in which the retaining-arms F are seated. The rings are shown with recesses for the reception of four retaining-arms; but any number of arms may be used, or they could be made much wider and a less number be used. This is a matter of convenience and judgment in laying the system. The escape-gas instead, therefore, of passing into the earth will be carried away by means of conveying-pipe C for consumption or storage, or be discharged into the atmosphere, as may be desired.

Fig. 2 illustrates the application of this form of my invention to a wrought-iron pipe-joint, a gas-chamber in this case being formed between the vertical face of the coupling-sleeve and the horizontal face of the pipe-section. Specific description is unnecessary. As shown in that figure, however, all of the conveying-pipes C will be preferably connected to a horizontal pipe, C', which can be placed above or upon the ground, or a very short distance below.

Instead of employing a pipe, B, to form the gas-collecting chamber, I may employ a right-angled flanged ring, B, such as shown in Figs. 6 and 7. The construction will be obvious; or I may employ a flat cone-shaped annular ring, B, as shown in Figs. 8 and 9. Other changes may also doubtless be made without departing from the spirit of my invention.

I am aware that heretofore gas-collecting chambers have been arranged around a pipe-coupling, and I do not claim such ground.

I claim as my invention—

1. The combination, substantially as set forth, of the two pipe-sections, the enlarged bell-mouth of one section or its equivalent, the coupling-sleeve, and the annular tube or cover for forming a gas-receiving chamber around the joint of the pipe, substantially as shown and described, and a gas-connecting pipe communicating with said chamber for conveying away escaping gas.

2. The combination of the joined sections of pipe, an annular tube or cover, which fits in the right-angular recess formed by the bell-shaped mouth of one of the pipe-sections or by a coupling-sleeve, whereby a gas-collecting chamber is formed, clamping devices for clamping said tube or cover firmly in place, and a gas-conveying pipe which conducts the escape-gas from said chamber.

3. The combination of the two pipe-sections, the annular ring or cover for forming a gas-collecting chamber in the annular recess formed by the bell-shaped mouth of one section of the pipe or by the coupling-sleeve, means for clamping said pipe or cover in position, a packing or cement or other suitable material around said cover, and a gas conveying pipe for conveying escape-gas from said chamber.

4. The combination of the pipe-sections, the annular tube or ring for forming the gas-collecting chamber, the clamp-rings, and the retaining-bars, substantially as set forth.

5. The combination of the pipe-sections, the perforated annular ring for forming a gas-collecting chamber, as described, the T-shaped connecting-piece, the tube for conveying away the escaping gas, and clamp devices for holding the perforated ring in place.

In testimony whereof I have hereunto subscribed my name.

LEMUEL BANNISTER.

Witnesses:
C. C. LEE,
CHAS. A. ROBB.